United States Patent
Beck et al.

[11] Patent Number: 6,159,373
[45] Date of Patent: Dec. 12, 2000

[54] CLEANING OF HOLLOW FIBRE MEMBRANES

[75] Inventors: Thomas William Beck; Humphrey John Jardine Drummond, both of South Windsor; Matthew Brian Lee, Lancefield; Clint Virgil Kopp, Castle Hill; Warren Thomas Johnson, Bligh Park, all of Australia

[73] Assignee: USF Filtration & Separations Group, Inc., Timonium, Md.

[21] Appl. No.: 08/809,679

[22] PCT Filed: Sep. 8, 1995

[86] PCT No.: PCT/AU95/00587

§ 371 Date: Aug. 8, 1997

§ 102(e) Date: Aug. 8, 1997

[87] PCT Pub. No.: WO96/07470

PCT Pub. Date: Mar. 14, 1996

[30] Foreign Application Priority Data

Sep. 9, 1994 [AU]  Australia ............................ PM 8006

[51] Int. Cl.[7] .................................................. B01D 61/00
[52] U.S. Cl. ...................... 210/636; 210/333.01; 210/798
[58] Field of Search ..................... 210/636, 798, 210/321.78, 321.79, 321.8, 321.69, 333.01, 500.23

[56] References Cited

U.S. PATENT DOCUMENTS

| | | | |
|---|---|---|---|
| 4,650,586 | 3/1987 | Ellis, III ................................. | 210/636 |
| 4,767,539 | 8/1988 | Ford ....................................... | 210/636 |
| 4,784,771 | 11/1988 | Wathen et al. ........................... | 210/636 |
| 4,816,160 | 3/1989 | Ford et al. .............................. | 210/636 |
| 4,921,610 | 5/1990 | Ford et al. .............................. | 210/636 |

(List continued on next page.)

FOREIGN PATENT DOCUMENTS 576424  8/1988  Australia .
582968  4/1989  Australia .

(List continued on next page.)

OTHER PUBLICATIONS

International Publication No. WO 93/02779; Publication Date: Feb. 18, 1993.
Communication Pursuant to Article 96(2) and Rule 51(2) EPC.

*Primary Examiner*—Ana Fortuna
*Attorney, Agent, or Firm*—Knobbe, Martens, Olson, & Bear LLP

[57] ABSTRACT

A method and apparatus for recovering fine solids from a liquid feed suspension is disclosed. The apparatus has an operating cycle including a concentration part of the cycle in which solids present in the feed suspension are concentrated and a backwash part of the cycle in which supply of feed suspension to the concentrator is interrupted, the concentrator comprises a shell (11), and a plurality of elastic, hollow, microporous, polymer fibers (12) being fixed at their ends within the shell (11). Pressurized feed suspension is supplied to the outside of the fibers during said concentration part of the cycle and the filtrate may be withdrawn from the fiber lumens during the operating cycle. During the backwash cycle the concentration part of the cycle is terminated by ceasing supply of feed to said exterior surface of the fibers (12). The shell (11) is then sealed and the remaining filtrate removed from the lumens. A source of fluid under pressure is then applied to said lumens before, at the same time as, or just after opening the shell (11) to atmosphere, to cause explosive decompression through the walls of the fibers (12) whereby the fluid under pressure passes through said walls. The pressure level in said lumens is maintained at a predetermined value for a sufficient time following said decompression to cause substantial portions of solids lodged within and/or on the fiber walls to be dislodged. The dislodged contaminant matter is then washed away by the application of a flow of liquid over the surface of the fiber walls; and the concentration part of the operating cycle is recommended by introducing the supply of feed suspension to said exterior surface of said fibers (12).

9 Claims, 10 Drawing Sheets

U.S. PATENT DOCUMENTS

| | | | |
|---|---|---|---|
| 4,931,186 | 6/1990 | Ford et al. | 210/636 |
| 4,935,143 | 6/1990 | Kopp et al. | 210/636 |
| 5,209,852 | 5/1993 | Sunaoka et al. | 210/636 |

FOREIGN PATENT DOCUMENTS

| | | |
|---|---|---|
| WO 85/01449 | 4/1985 | WIPO . |
| WO 86/05705 | 10/1986 | WIPO . |
| WO 88/01529 | 3/1988 | WIPO . |

# CLEANING OF HOLLOW FIBRE MEMBRANES

TECHNICAL FIELD

The present invention relates to concentration of solids in a suspension using a hollow fibre membrane and, in particular forms, to methods and apparatus for periodically cleaning by backwashing the hollow fibre membranes.

BACKGROUND ART

Prior art methods of concentrating solids in a liquid suspension are described in Australian patent specifications 576,424 and 582,968. The text and drawings of these specifications are incorporated herein by cross-reference. In that prior art, concentration is effected by a filter element that comprises a bundle of hollow, porous, polymeric fibres in a closed cartridge or shell. Polyurethane potting compound is used to hold the respective ends of the fibres in place within the cartridge without blocking the fibre lumens and to close off each end of the cartridge.

The transmembrane pressure differential necessary to effect concentration of the solids in the prior art is achieved by pressurising the feedstock which necessitates the use of pumps, other ancillary equipment and, of course, a closed filter cartridge.

Backwashing of such prior art concentrators involves increasing the pressure on both sides of the hollow fibres within the closed shell to a relatively high value before suddenly releasing that pressure on the shell side of the fibre walls to effect a sudden pressure differential across the walls which causes a backwash action.

DISCLOSURE OF INVENTION

It is an object of this invention to provide an improved method of using a reverse-flow mode to dislodge solids retained by filter elements to ensure rapid removal of those retained solids and in which the separation and dislodgement modes may be repeated for prolonged periods of time.

The present invention, in at least some embodiments, provides a method of backwashing a hollow fibre filter which retains some of the features of the prior art, but optimizes a number of these features to provide improved performance.

Accordingly, in one broad form of the invention, there is provided a method of backwashing a plurality of hollow fibres having microporous walls which have been subjected to a filtration operation wherein feed containing contaminant matter is applied to the exterior surface of said hollow fibres and filtrate withdrawn from the ends of the lumens of the fibres, the fibres being contained within a shell or housing, said method comprising:

(a) terminating the filtration operation by ceasing supply of feed to said exterior surface of said fibres, (b) sealing the shell and substantially removing remaining filtrate from said lumens, (c) applying a source of fluid under pressure to said lumens before, at the same time as, or just after opening the shell to atmosphere, to cause explosive decompression through the walls of the fibres whereby said fluid under pressure passes through said walls;

(d) maintaining the pressure level in said lumens at a predetermined value for a sufficient time following said decompression to cause substantial portions of contaminant matter lodged within and/or on said fibre walls to be dislodged;

(e) washing dislodged contaminant matter away by the application of a flow of liquid over the external surface of said fibre walls; and (f) recommencing the filtration operation by introducing said supply of feed to said exterior surface of said fibres.

For preference, during the backwash phase, the time lapse between the start of an increase in negative transmembrane pressure (TMP) and such TMP reaching a maximum value corresponding to the explosive decompression, is in the range of about 0.05 seconds to about 5 seconds.

Preferably, the fibres are rewetted prior to recommencing the filtration operation.

Preferably, feed liquid is pumped into the shell side of the filter while fluid pressure is still being applied to said lumens. This results in liquid/fluid turbulence or fronting around the membrane pores causing further improved dislodgement of retained solids. The fluid pressure during this phase preferably should exceed the shell side pressure by about 10 kPa to about 800 kPa.

Preferably, the steps of the method are carried out as a continuous process utilizing repetitive cycles of solids retention and backwash.

As an alternative preferred form, step (b) is effected by allowing said remaining filtrate to drain out of said lumens of its own volition.

According to a further broad aspect, the present invention provides a concentrator for recovering fine solids from a liquid feed suspension and having an operating cycle including a concentration part of the cycle in which solids present in the feed suspension are concentrated and a backwash part of the cycle in which supply of feed suspension to the concentrator is interrupted, said concentrator comprising:

(i) a shell;

(ii) a plurality of elastic, hollow, microporous, polymer fibres being fixed at their ends within the shell;

(iii) means for supplying pressurized feed suspension to the outside of the fibres during said concentration part of the cycle;

(iv) means for withdrawing filtrate from the fibre lumens during said operating cycle;

(v) means for terminating the concentration part of the cycle by ceasing supply of feed to said exterior surface of said fibres;

(vi) means for sealing and opening the shell to atmosphere;

(vii) means for substantially removing remaining filtrate from said lumens;

(viii) means for applying a source of fluid under pressure to said lumens before, at the same time as, or just after opening the shell to atmosphere, to cause explosive decompression through the walls of the fibres whereby said fluid under pressure passes through said walls;

(ix) means for maintaining the pressure level in said lumens at a predetermined value for a sufficient time following said decompression to cause substantial portions of solids lodged within and/or on said fibre walls to be dislodged;

(x) means for washing dislodged contaminant matter away by the application of a flow of liquid over the external surface of said fibre walls; and (xi) means for recommencing the concentration part of the operating cycle by introducing said supply of feed suspension to said exterior surface of said fibres.

Preferably, the concentrator includes means for rewetting the fibres before recommencing concentration.

Where fluid pressure is applied to remove the filtrate from the lumens, this pressure is typically in the range of about 10 to about 600 kPa. The fluid pressure applied to the lumens prior to the decompression is typically in the range of about 100 to about 1200 kPa.

The penetration of gas into the pores of a membrane is resisted by the surface tension forces of the contained wall-wetting liquid according to well known theory. Indeed, surface tension is conveniently measured by the breakthrough pressure needed to force a bubble out of a submerged orifice. For common systems (such as oil in hydrophobic pores or water in hydrophilic pores) the breakthrough pressures are much higher than the usual operating pressures of the filter.

Prior art hollow-fibre type ultrafilters are usually fed from the inside of the fibres for many well known reasons. However, according to the present invention, feedstock is applied to the outside of the fibres and gas is introduced into the lumen of the fibre as the back-wash medium. In some cases, the lumen pressure swells a suitably designed fibre so that the pores are enlarged whereby the particles are freed and swept away in the expansion of the back-wash gas.

In some cases, especially where very fine-pored interstitial material is deposited in relatively coarse-pored base fibre, it is advantageous to back-wash first with a small amount of permeate already in the membrane lumen and follow with the high pressure gas back-wash. In this way, the small amount of permeate adequately washes out fine blocking material from within the interstices, and the overall cleaning is completed by the higher pressure gas swelling the base pores and erupting around elastic openings. The pores must close again rapidly to reseal the holes and the base material must not crack by work hardening and must remain within its modified elastic limit.

Preferably, the fibres are made from thermoplastic polymers such as:

poly(propylene), poly(4-methylylpent-1-ene), co-polymers of polypropylene, poly(vinylidenedifluoride), poly(sulphones), poly(phenylene sulphides), poly(phenylene oxides), phenoxy resins, polyethylene, poly(tetrafluoroethylene) and poly(chlorotrifluoroethylene).

The use of gas as a back-wash medium enables the removal of fouling species by explosive decompression of the gas through the membrane structure for the minor part and at the outer membrane surface for the major part. Thus, the gaseous back-wash step is carried out at a pressure which is sufficient to overcome the effect of the surface tension of the continuous phase of the feedstock within the pores of the membrane.

Hitherto, it was felt the gas backwashing phase should be limited to below 5 seconds to avoid drying out of the fibres and thus difficulty in recommencing filtration due to gas bubble retention in the fibre pores. The introduction of improved rewetting techniques has overcome this problem and it has been discovered that extending the gas backwash phase beyond 5 seconds has significant advantages. Time periods of up to 60 seconds have been found to be effective. A longer backwash provides improved removal of trapped solids. Also, where liquid is reintroduced to the shell prior to completion of the gas backwash, it has enabled the overlap where gas and liquid are both present to be extended. An overlap time of about 1 to about 30 seconds is preferable. This is desirable in large arrays where it may take considerable time, with normal pump pressures, to refill the shells with liquid. The extended time period enables normal pumps to be used to achieve the above overlap while it also avoids maldistribution of pressure within large filter arrays by allowing relatively slow refilling of the filter shells.

In another form of the invention, the high pressure fluid application to the lumens may be pulsed to provide a number of explosive decompressions within the backwashing phase. These individual pulses are preferably between about 0.1 seconds and about 5 seconds in duration. This provides an advantage of reducing gas consumption in the backwash phase. The pulsing may be achieved by sealing and opening the shell at appropriate time intervals sufficient to allow pressure within the lumens to build up to a required level. Alternatively, the pressure supply may be pulsed to achieve the same effect. In a further embodiment, the pressure may be varied between a high and low level without actual total shut off of pressure.

BRIEF DESCRIPTION OF DRAWINGS

Preferred embodiments of the present invention will now be described, by way of example only, with reference to the following examples and accompanying drawings, in which.

MODES FOR CARRYING OUT THE INVENTION

Figure 1:
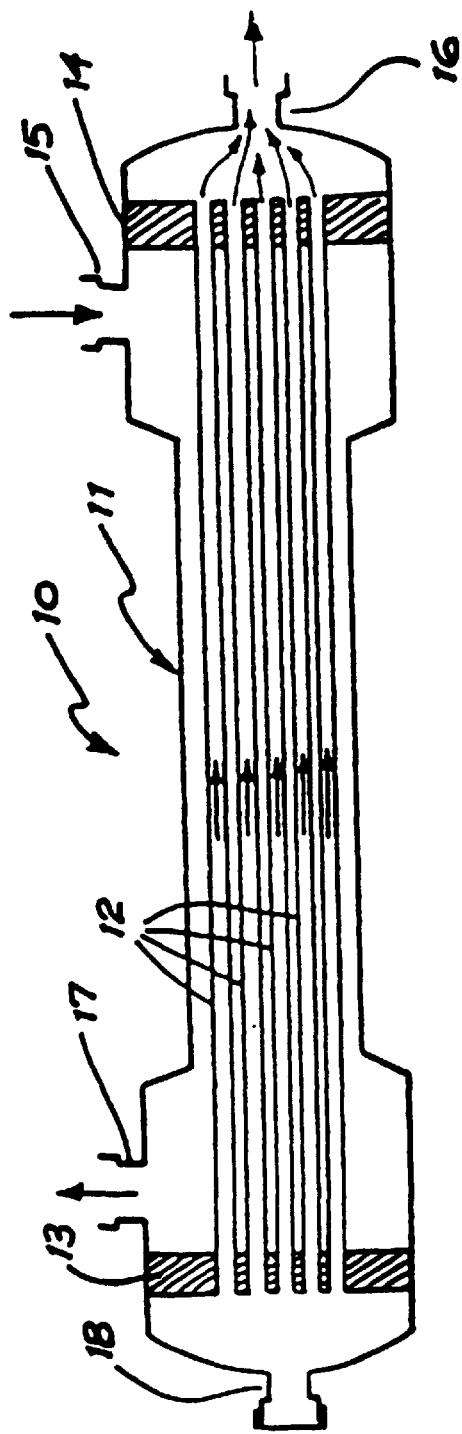
FIG. 1 shows a schematic representation of a hollow fibre cross-flow concentrator to which the present invention is applicable in an operating mode.
Figure 2:
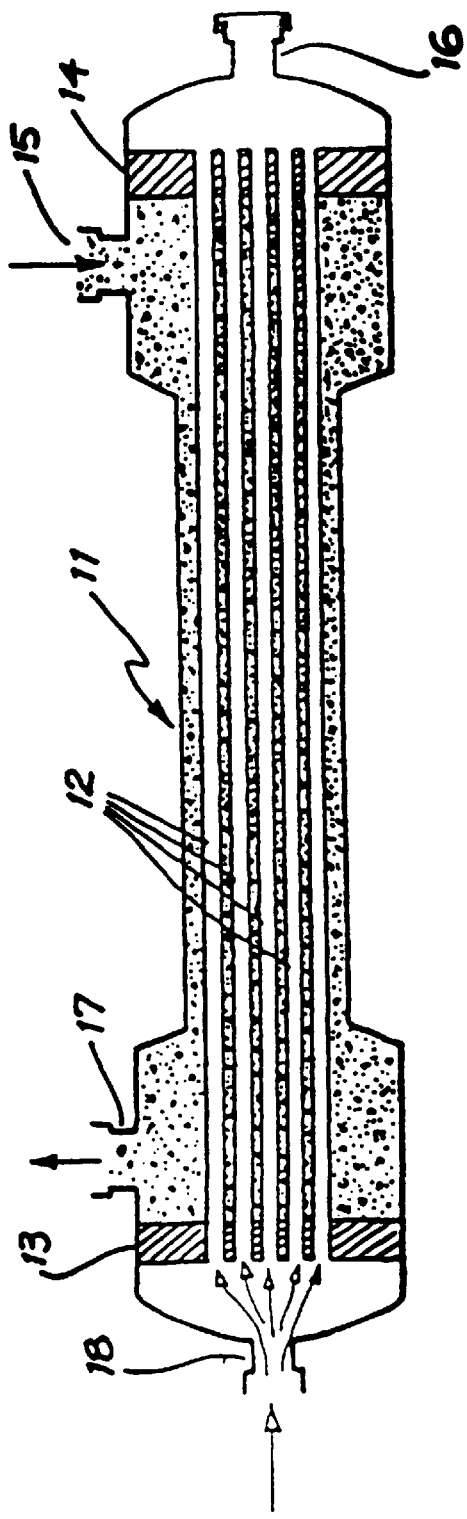
FIG. 2 shows the concentrator of FIG. 1 in backwash mode.

The hollow fibre cross-flow concentrator 10 shown in FIGS. 1 and 2 includes a cartridge shell 11 within which is positioned a bundle of hollow, porous, polymeric fibres 12. In this instance, each fibre is made of polypropylene, has an average pore size of 0.2 $\mu$m, an internal lumen diameter in the range 250 $\mu$m to 310 $\mu$m and a fibre diameter in the range 500 $\mu$m to 650 $\mu$m. There may be between 2,800 to 30,000 hollow fibres in the bundle 12 but this number as well as the individual fibre dimensions may be varied according to operational requirements.

Polyurethane potting compound 13,14 holds the ends of the fibres 12 in place without blocking their lumens and closes off each end of the shell 11. The liquid feed suspension to be concentrated is pumped into the shell 11 through feed suspension inlet 15 and passes over the external walls of the hollow fibres 12. Some of the feed suspension passes through the walls of the fibres 12 into the lumens of the fibres to be drawn off through the lumen outlet port 16 as clarified liquid.

The remaining feed suspension and some of the rejected species flows between the fibres 12 and leaves the shell 11 through outlet 17. The remainder of the rejected species is held onto or within the fibres or is otherwise retained within the shell. Lumen inlet port 18 remains closed during the operating mode of the concentrator shown in FIG. 1.

In order to remove the retained species, lumen outlet port 16 is closed so that the flow of clarified liquid is stopped. The clarified liquid is then removed from the lumens by natural drainage or by introducing a pressurized gas through lumen inlet port 18 to force the liquid from the lumens. Upon completion of the removal of the filtrate liquid, high pressure compressed gas is introduced through inlet 18 and the lumens of the fibres 12. The liquid-filled shell is sealed and gas cannot penetrate the porous walls even though the gas pressure is now raised well above the normal bubble point of the fibre walls because the liquid within the shell is relatively incompressible. A reservoir of high pressure gas is thus accumulated in the fibre lumens.

The shell outlet 17 is then opened which allows gas to penetrate the pores along the whole length of each fibre. This results in a explosive decompression of the pressurized gas through the walls of the fibres resulting in the retained solids in the fibre walls being dislodged from the fibres into the feed side of the filter. The initial breakthrough of gas through the fibre wall results in a tendency for pressure to drop in the lumens. It is desirable if this pressure can be maintained for a short period following decompression to cause increased flow through the fibre wall and greater removal of retained solids. This is preferably achieved by providing a large diameter pressure feed to the lumens and/or a higher pressure to compensate for pressure drop. In some cases, it is desirable to admit gas through both lumen ports 16 and 18 after carrying out the above described pressurised, trapped gas operation.

In alternate embodiments, the shell is opened just before or at the same time as the pressurized gas is applied to the lumens.

Referring to the accompanying graphs, a number of examples will now be described to illustrate the improved performances provided by embodiments of the invention.

EXAMPLE 1

An M10C (250 μm lumen) filter unit was run using a larger airline to provide an increased and prolonged pressure to the lumens following the explosive decompression phase. A 2.5 cm airline was used instead of a standard 10 mm airline. There was no pressurize stage used during this improved backwash and the negative transmembrane pressure (TMP) obtained on the filter unit was 620 kPa compared with 380 kPa for a standard backwash. The air consumption was higher than that for a standard backwash. The pressure profiles of the two different backwashes are shown in FIGS. 3 and 4.

Figure 3:
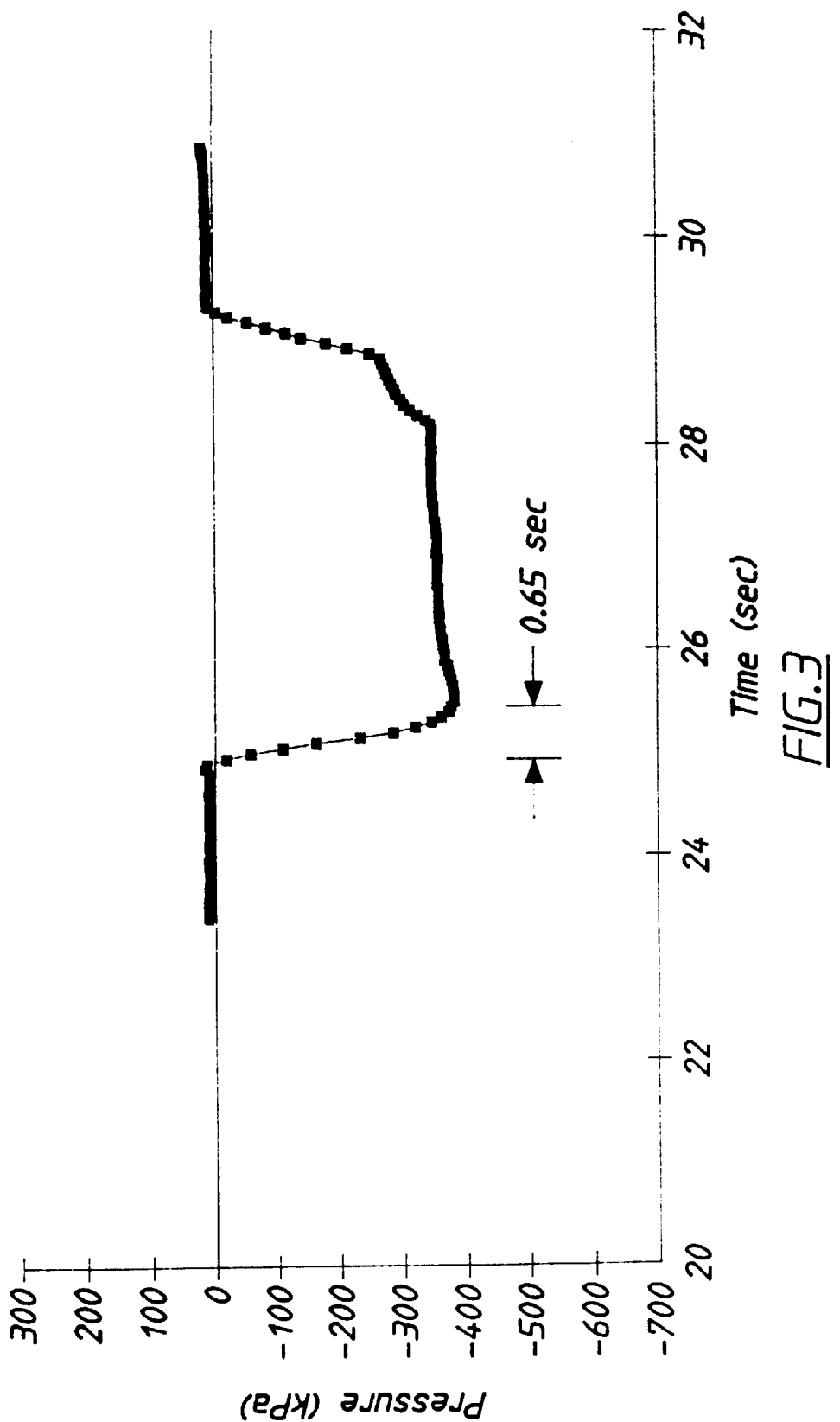
FIG. 3 shows a graph of transmembrane pressure (TMP) versus time for a standard backwash.
Figure 4:
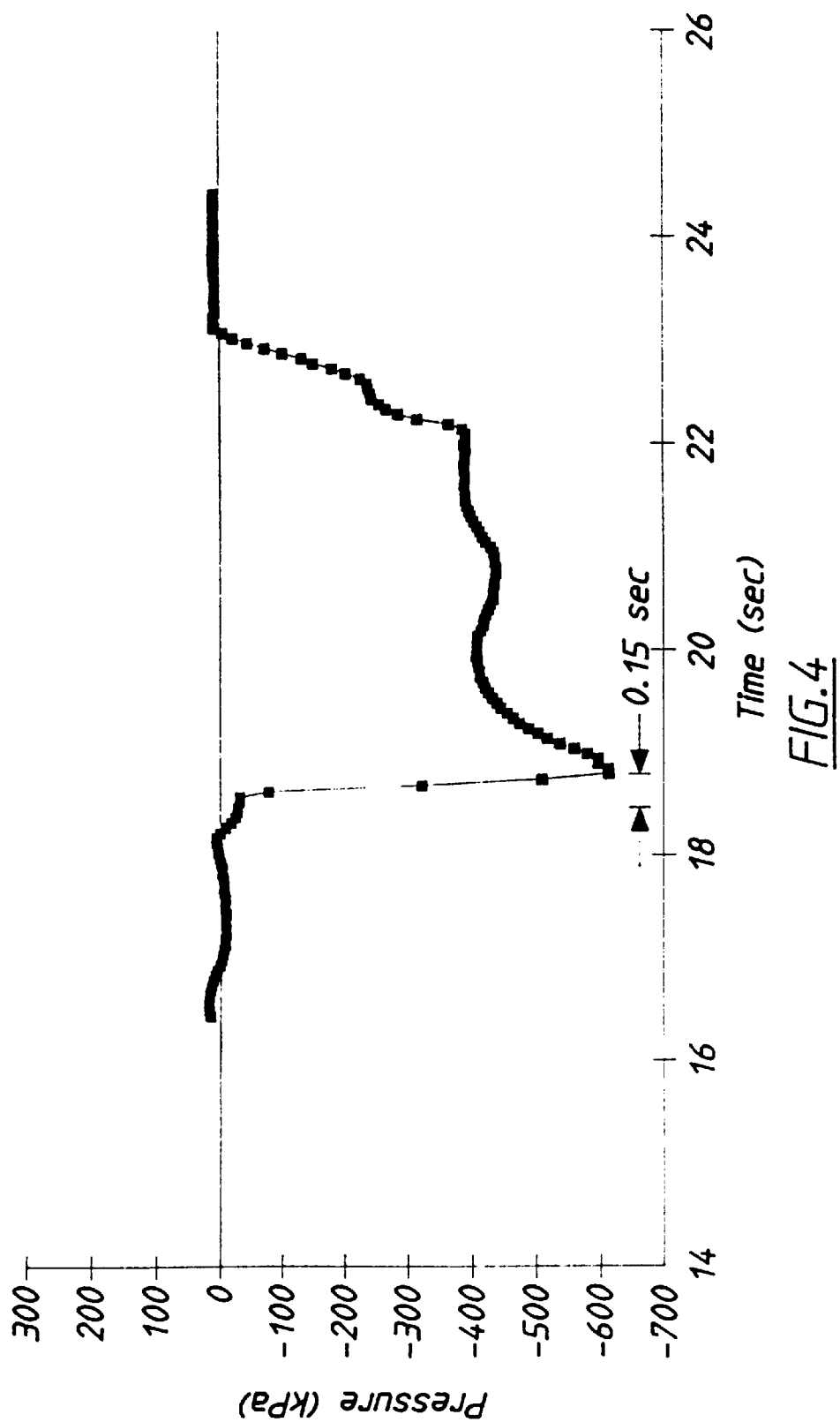
FIG. 4 shows a similar graph to FIG. 3 using a backwash according to one aspect of the invention.

During the standard backwash shown in FIG. 3, it can be seen that a time of 0.65 seconds elapses between the start of the explosive decompression phase and the point at which maximum TMP is obtained. Analysis of the similar section of the improved backwash shows the time to reach maximum negative TMP was only 0.15 seconds. The reaching of maximum TMP corresponds with the air breaking through the walls of the fibre and expelling the fluid within the wall pores. The period between the opening of the shell and the breakthrough is a liquid backwash phase as the liquid within the pores is being moved outwardly from the lumen toward the shell side. When the air breaks through the fibre wall the liquid backwash phase is completed. Preferably this period is within the range 0.05 seconds to 5 seconds.

The results of consecutive runs on the test filter unit comparing the standard and the improved backwash (termed a "mega" backwash herein) procedures are shown in attached TABLE 1.

Figure 5:
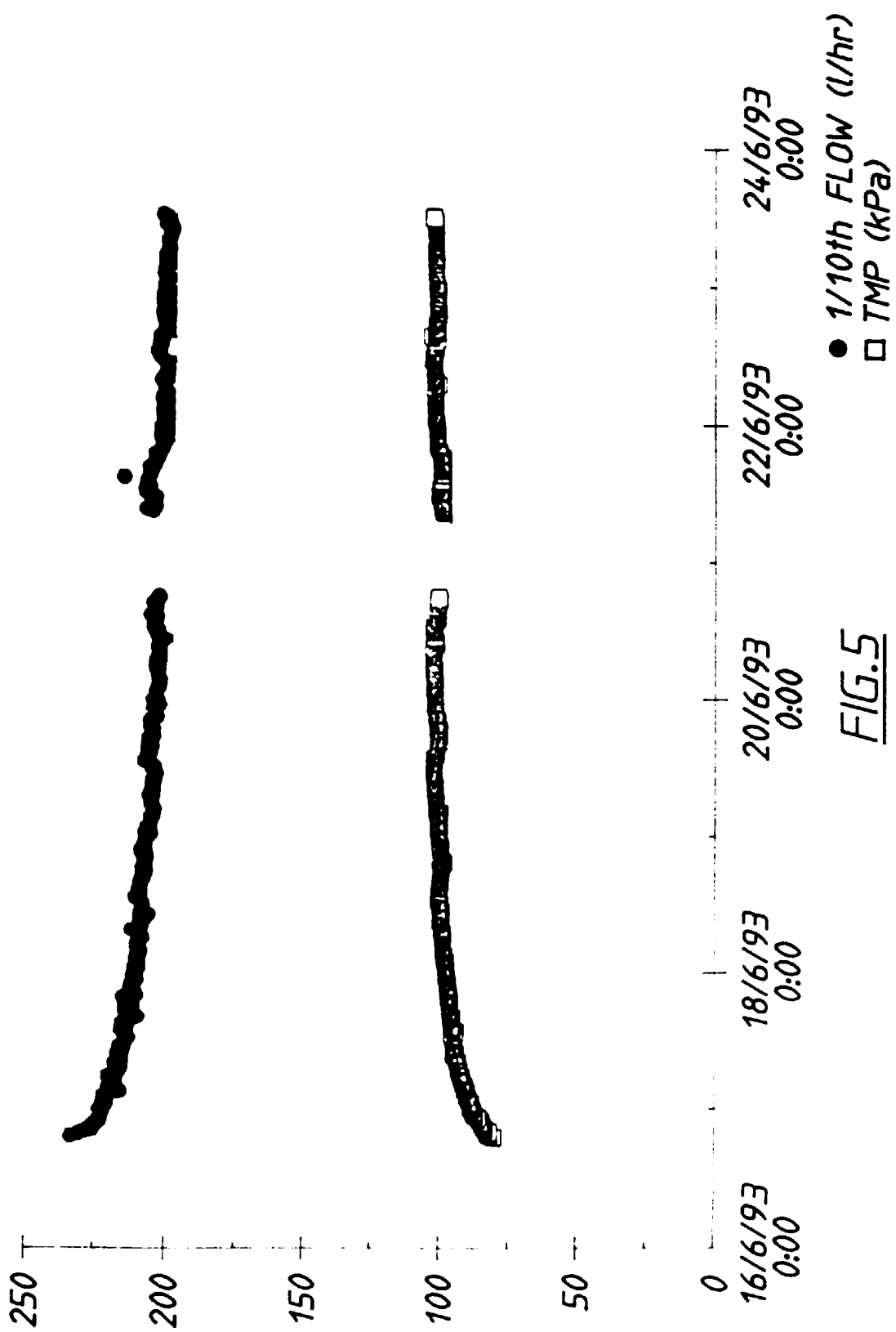
FIG. 5 shows a normalized flow/TMP versus time graph for a standard backwash.
Figure 6:
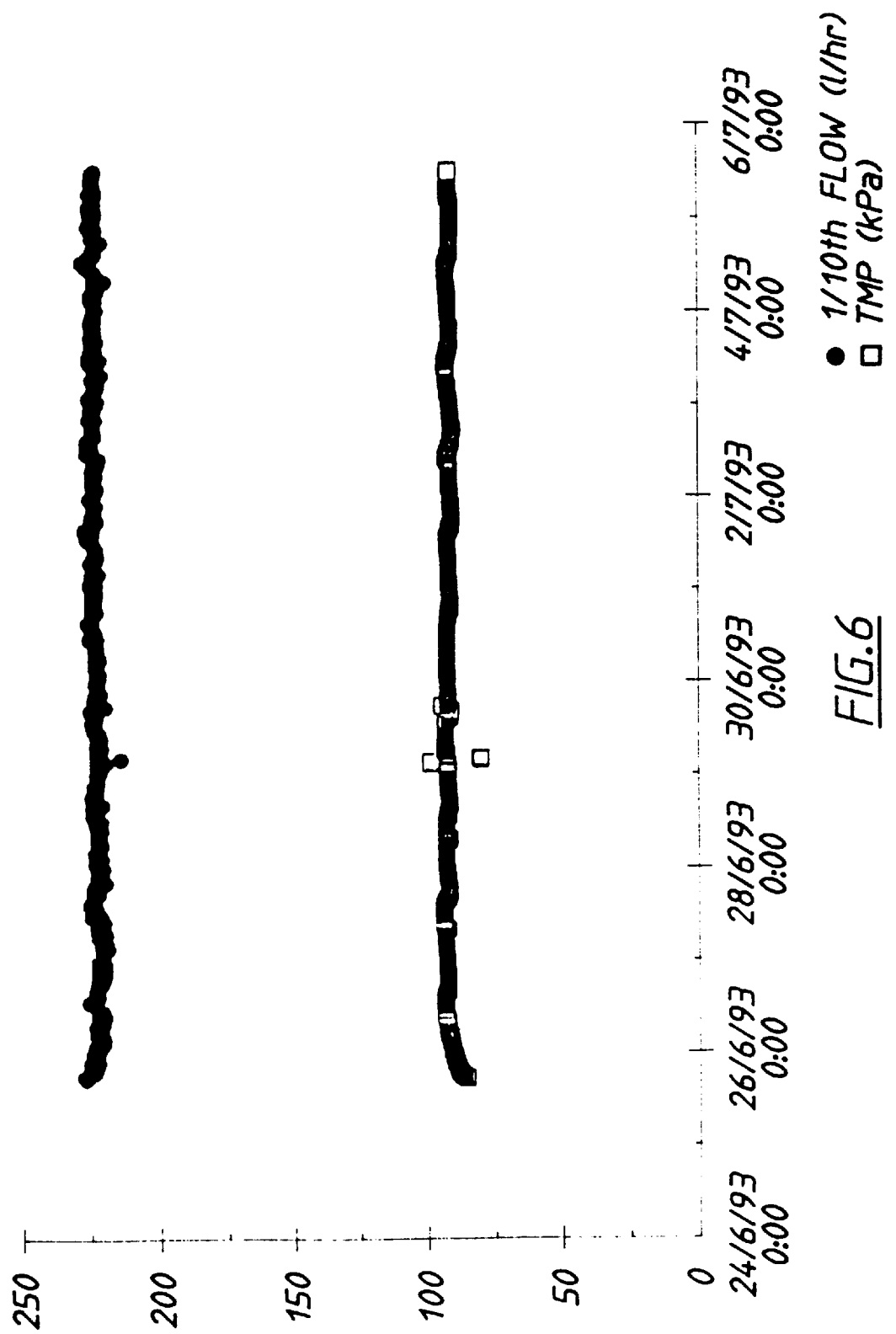
FIG. 6 shows a normalized flow/TMP versus time graph for the same type of machine as FIG. 5 but using the backwash according to one aspect of the invention.
Figure 7:
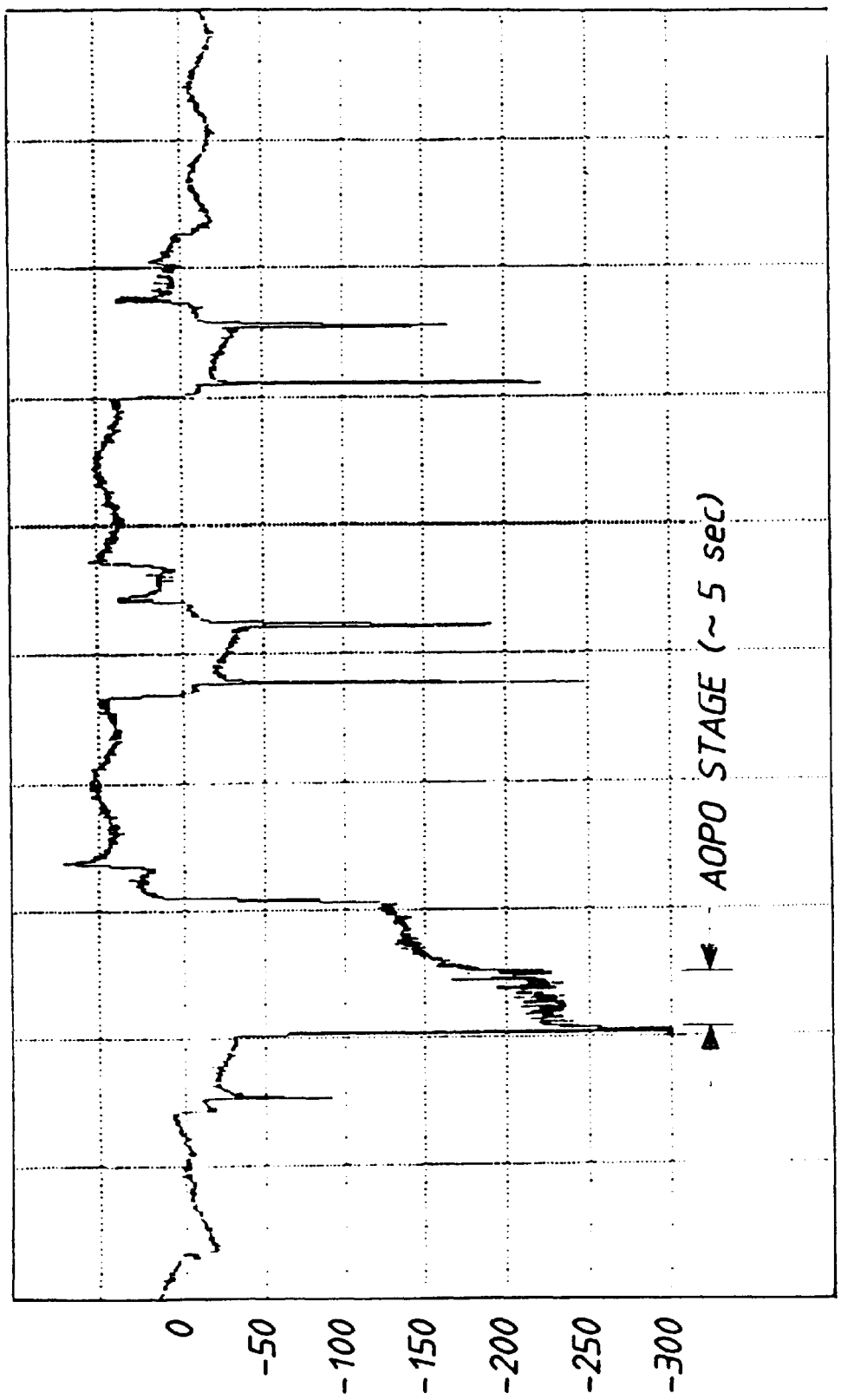
FIG. 7 shows a graph of TMP versus time for a backwash where feed liquid is pumped into the filter while the gas backwash is still applied.

As can be seen from TABLE 1 and the performance graphs (FIGS. 5 and 6), the TMP rise is significantly reduced when the "mega" backwash is used. The TMP rise per day for the 'mega' backwash was approximately one quarter of the TMP rise seen with the standard backwash. This result means that machines could be run for longer between cleaning cycles, or the machines could give a higher throughput for the same cleaning interval.

EXAMPLE 2

This example relates to the procedure where feed liquid is reintroduced to shell while the gas backwash is still proceeding. A trial was carried out on surface water to compare a standard backwash with a backwash stage using pressurized gas plus feed liquid. This stage is typically referred to as an "air on pump on" stage (AOPO stage).

Two identical 1M10C filter units were set up to run side by side on river water. One machine used a standard pressurize backwash cycle, whilst the other incorporated an extra stage. The extra stage consisted of switching on the feed pump whilst still applying high pressure air through the hollow fibre walls. The resultant two phase flow across the fibre bundle appeared to be very effective in removing fouling from the membrane module.

Figure 8:
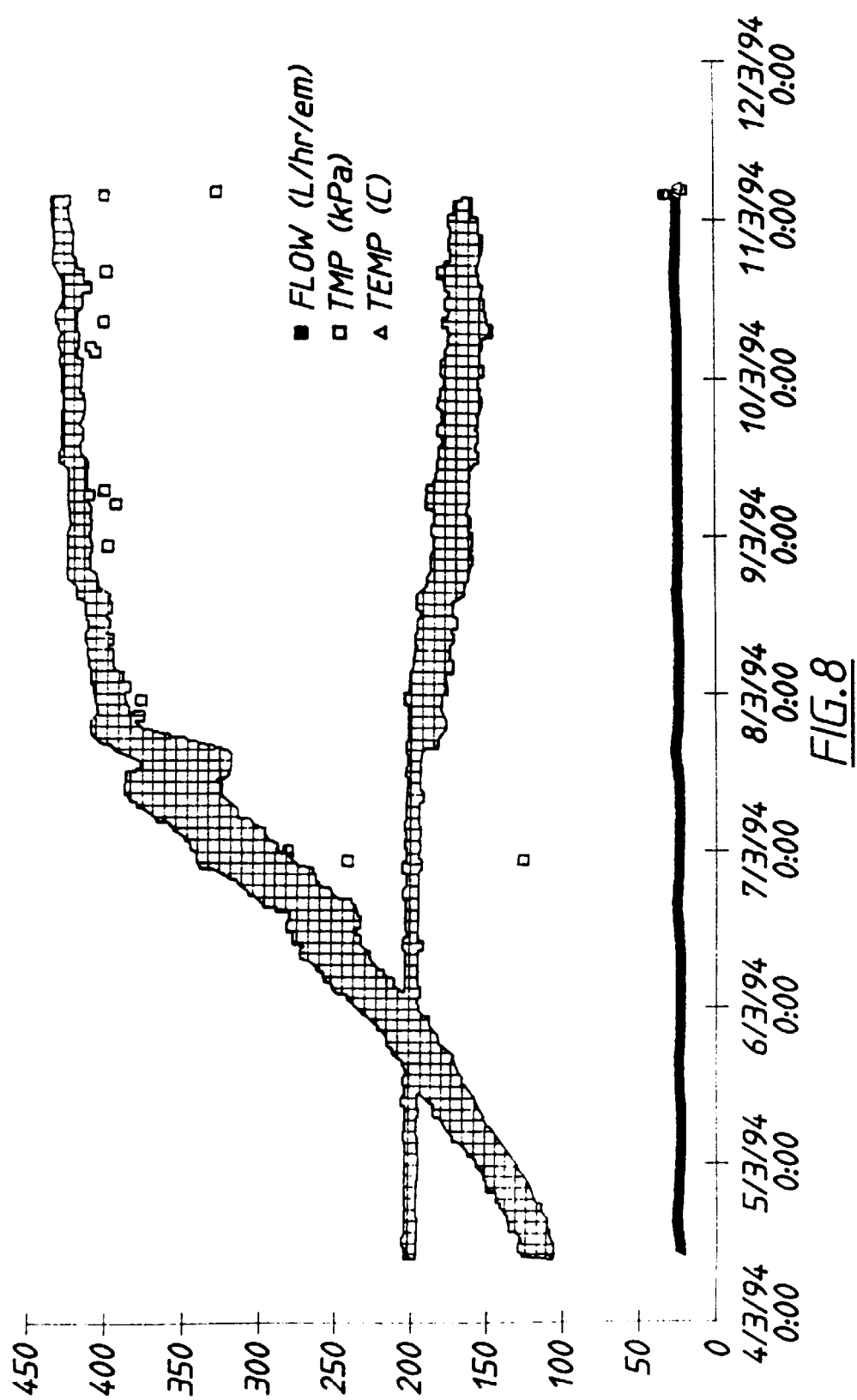
FIG. 8 shows a normalized flow/TMP versus time graph for a standard backwash.
Figure 9:
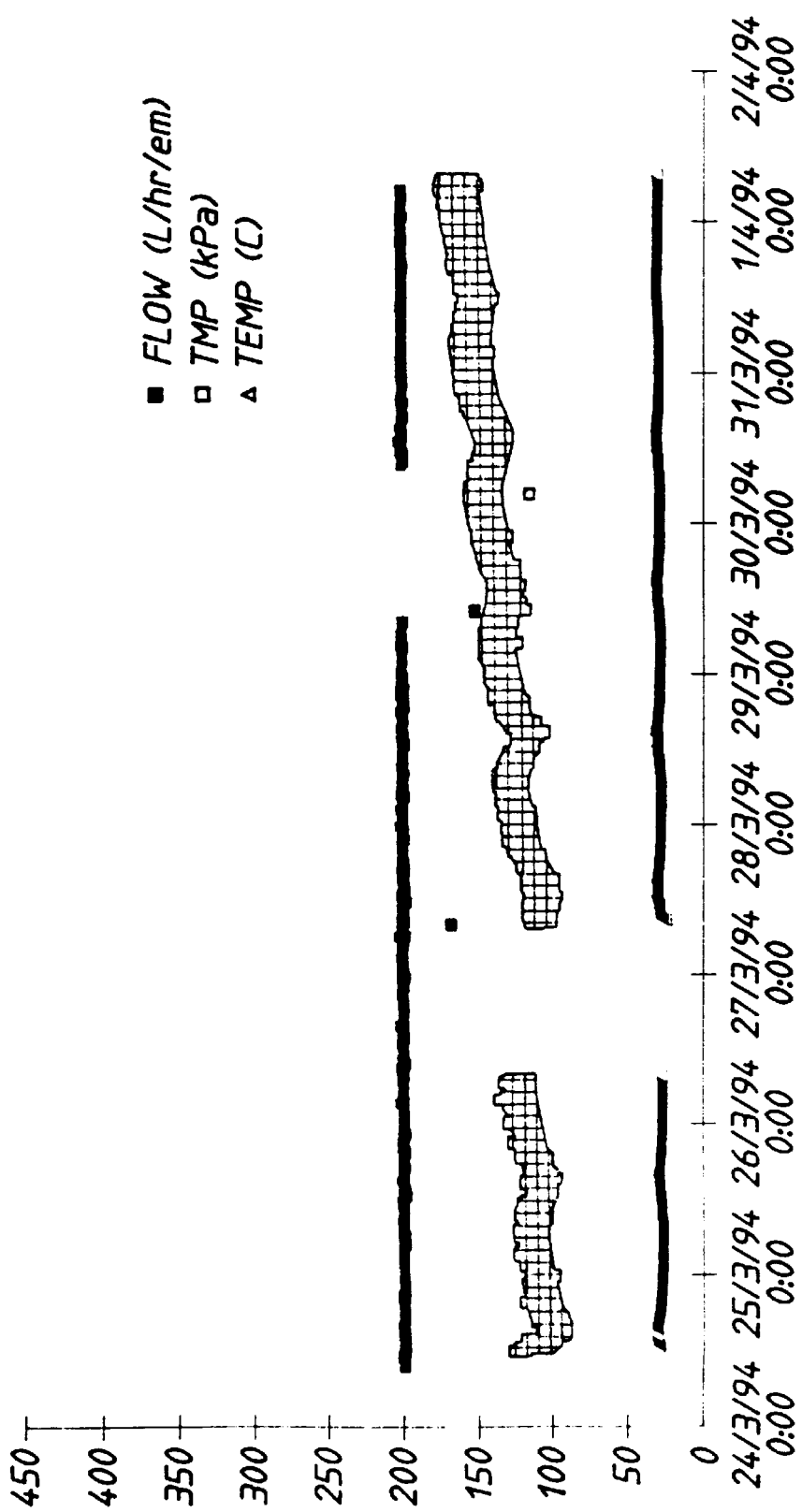
FIG. 9 shows a normalized flow/TMP versus time graph for the same type of machine as FIG. 8 but introducing feed liquid during the backwash cycle.
Figure 10:
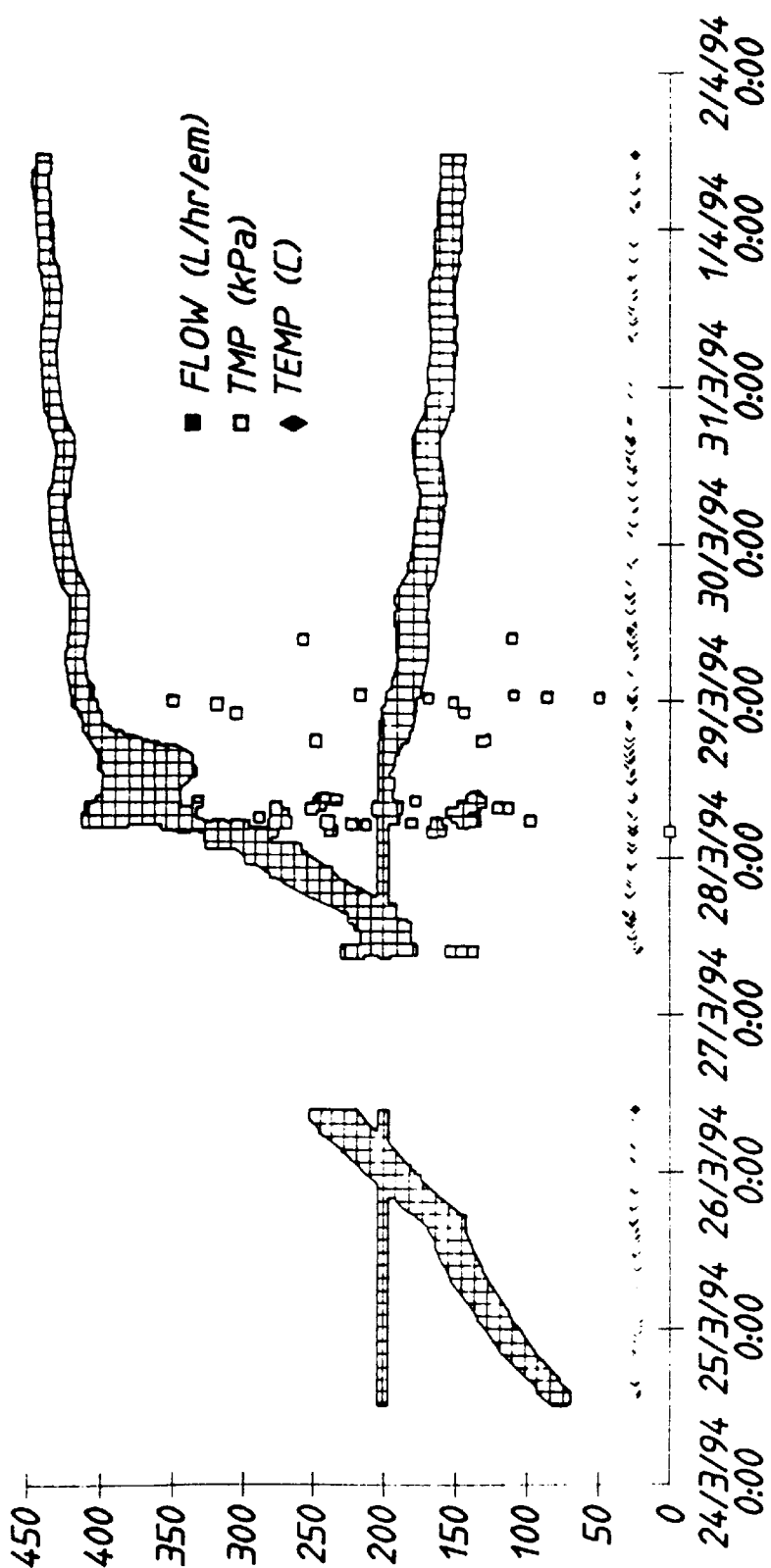
FIG. 10 shows a normalized flow/TMP versus time graph for a standard backwash at a further installation.
Figure 11:
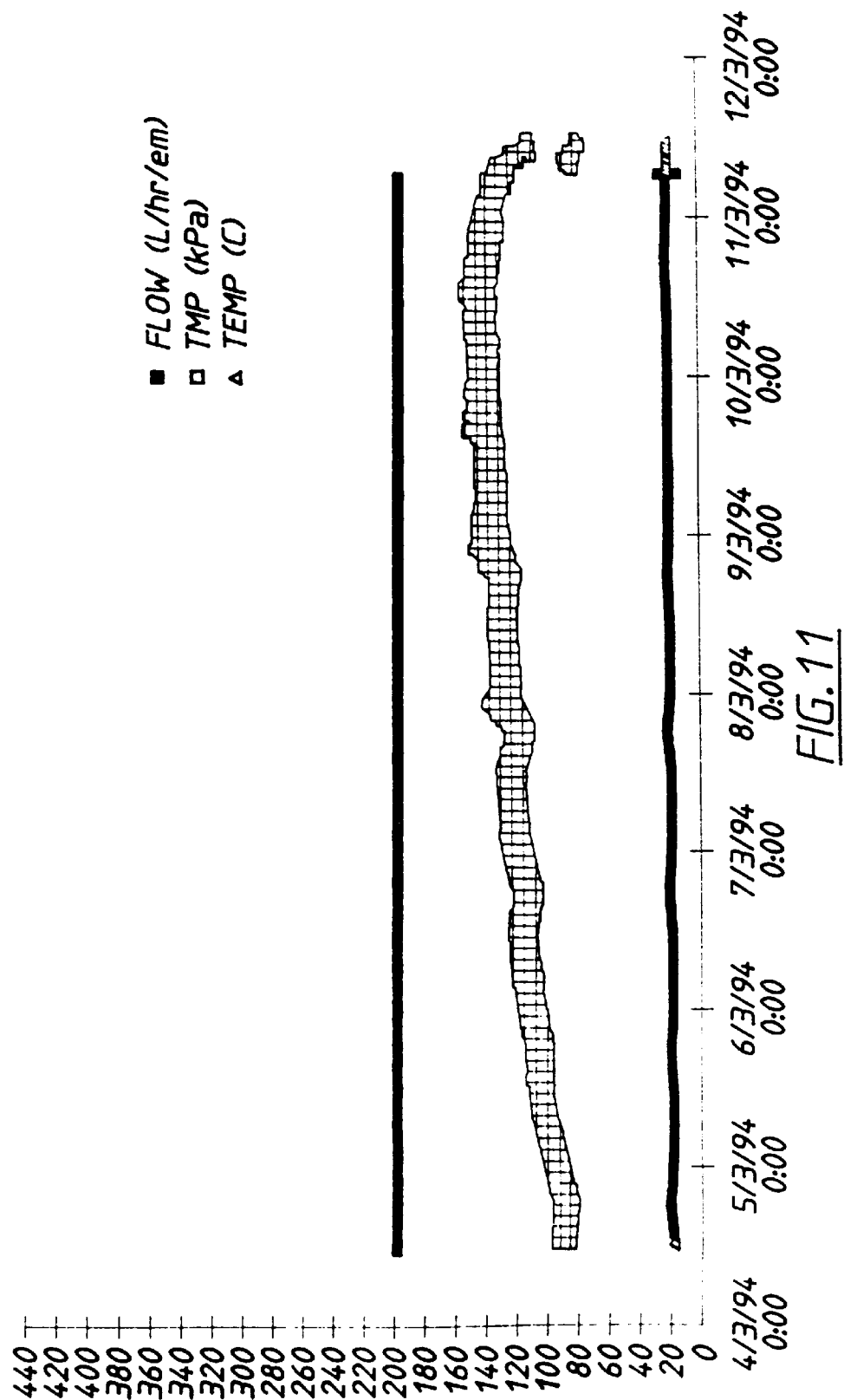
FIG. 11 shows a normalized flow/TMP versus time graph for the same type of machine as FIG. 10 but introducing feed liquid during the backwash cycle.

The two filter units were running at a constant flow of 200 L/hr/em, using a pump with a variable speed drive to keep the set flow. The area unit em is related to the surface area of an original Memtec filter module. FIGS. 8 and 10 illustrate the results of two consecutive runs of a filter unit and show that the TMP, when the standard backwash was used, rose to 400 kPa within 4 days of operation. At this point the unit could no longer maintain the set flow of 200 L/hr/em. FIGS. 9 and 11 show that when the AOPO stage was used the TMP remained below 150 kPa for 7 days. The result of this is that the filter units could maintain a higher flow rate for a longer period of time when the AOPO stage is used in the backwash. This is important to filter unit efficiency as the units require chemical cleaning when the TMP reaches a predetermined value.

Typically during the backwash the decompression stage consists of the lumens being pressurized to 600 kPa, then the shell side valves being released whilst still supplying air to the lumens (for typically 1 to 3 seconds on most applications). The AOPO stage would extend the amount of time air is resupplied to the fibre lumens by typically an extra 1 to 30 seconds on M10 units.

It will be appreciated that further embodiments and exemplifications of the invention are possible without departing from the spirit or scope of the invention described.

TABLE 1

M10C (250 μm lumens) comparison of 'mega' and standard backwashes

| BACKWASH TYPE | STANDARD | MEGA |
|---|---|---|
| Module Type | PP M10C (20,000 fibres) | PP M10C (20,000 fibres) |
| Feed Type | River water | River water |
| Feed Turbidity (NTU) | 8 | 7 |
| Feed Temperature (° C.) | 9.3 | 9.3 |
| TMP (kPa) | 103 | 92 |
| TMP Range (kPa) | 82 to 108 | 86 to 91 |
| Instantaneous Flow* (L/hr/module) | 2084 | 2223 |
| Instantaneous Flow* (L/hr/module) at 20° C. | 2855 | 3045 |

*Instantaneous flow is the average of instantaneous flowrates measured.

We claim:

1. A method of backwashing a plurality of hollow fibres having microporous walls which have been subjected to a filtration operation wherein feed containing contaminant matter is applied to the exterior surface of said hollow fibres and filtrate withdrawn from the ends of the lumens of the fibres, the fibres being contained within a shell or housing, said method comprising:

(a) terminating the filtration operation by ceasing supply of feed to said exterior surface of said fibres, (b) sealing the shell and substantially removing remaining filtrate from said lumens, (c) applying a source of fluid under pressure to said lumens before, at the same time as, or just after opening the shell to atmosphere, to cause explosive decompression through the walls of the fibres whereby said fluid under pressure passes through said walls;

(d) maintaining the pressure level in said lumens at a predetermined value for a sufficient time following said decompression to cause substantial portions of contaminant matter lodged within and/or on said fibre walls to be dislodged;

(e) washing dislodged contaminant matter away by the application of a flow of feed liquid over the external surface of said fibre walls; and (f) recommencing the filtration operation by reintroducing said supply of feed to said exterior surface of said fibres while fluid pressure is still being applied to said lumens.

2. A method of backwash according to claim 1 wherein the fibres are rewetted prior to reconnecting the filtration operation.

3. A method of backwashing according to claim 1, wherein during step (c), the lapse time between the start of application of fluid under pressure to the explosive decompression is in the range of about 0.05 seconds to about 5 seconds.

4. A method of backwashing according to claim 3 wherein the fibres are rewetted prior to recommencing the filtration operation.

5. A method of backwashing according to claim 1 wherein feed liquid is reintroduced for a period of between about 1 to about 30 seconds.

6. A method according to claim 1 wherein said fluid pressure exceeds shell side pressure by about 10 kPa to about 800 kPa.

7. A method of backwashing according to claim 1 wherein the pressure applied to said lumens prior to said explosive decompression is between about 100 kPa to about 1200 kPa.

8. A method according to claim 1 wherein during step (b) the filtrate is allowed to drain out of said lumens of its own volition.

9. A method according to claim 1 wherein the steps of the method are curried out as a continuous process utilizing repetitive cycles of solids retention and backwash.

* * * * *